United States Patent [19]

Shanefield et al.

[11] Patent Number: 5,002,710
[45] Date of Patent: Mar. 26, 1991

[54] COMPOSITION USEFUL FOR PRODUCING THIN CERAMIC SHEETS

[75] Inventors: Daniel J. Shanefield, Princeton, N.J.; Rajan A. Desai, Champaign, Ill.

[73] Assignee: Rutgers University a not for profit corporation of the State of New Jersey, New Brunswick, N.J.

[21] Appl. No.: 424,517

[22] Filed: Oct. 20, 1989

Related U.S. Application Data

[63] Continuation-in-part of Ser. No. 296,519, Jan. 12, 1989, abandoned.

[51] Int. Cl.$^5$ .............................................. C04B 33/13
[52] U.S. Cl. ....................................... 264/63; 264/166; 264/171
[58] Field of Search ........................... 264/63, 166, 171

[56] References Cited

U.S. PATENT DOCUMENTS

| | | | |
|---|---|---|---|
| 2,582,993 | 1/1952 | Howatt | 264/63 |
| 2,966,719 | 1/1961 | Park | 264/63 |
| 3,780,150 | 12/1973 | Stetson et al. | 264/63 |
| 4,587,068 | 5/1986 | Borase et al. | 264/63 |

Primary Examiner—James Derrington
Attorney, Agent, or Firm—Omri M. Behr

[57] ABSTRACT

Long chain fatty acids such as stearic acid are novel additives in a composition comprising a polymer binder plus a ceramic powder and various other additives, which can be fired to become a thin, flat sheet of ceramic. A typical process using this composition includes aggressive mixing such as ball milling, followed by doctor blade tape casting. The fatty acid additive in addition to other materials used as dispersing agents provides a cast composition which is less susceptible to cracking during drying than previous tape casting compositions.

8 Claims, 1 Drawing Sheet

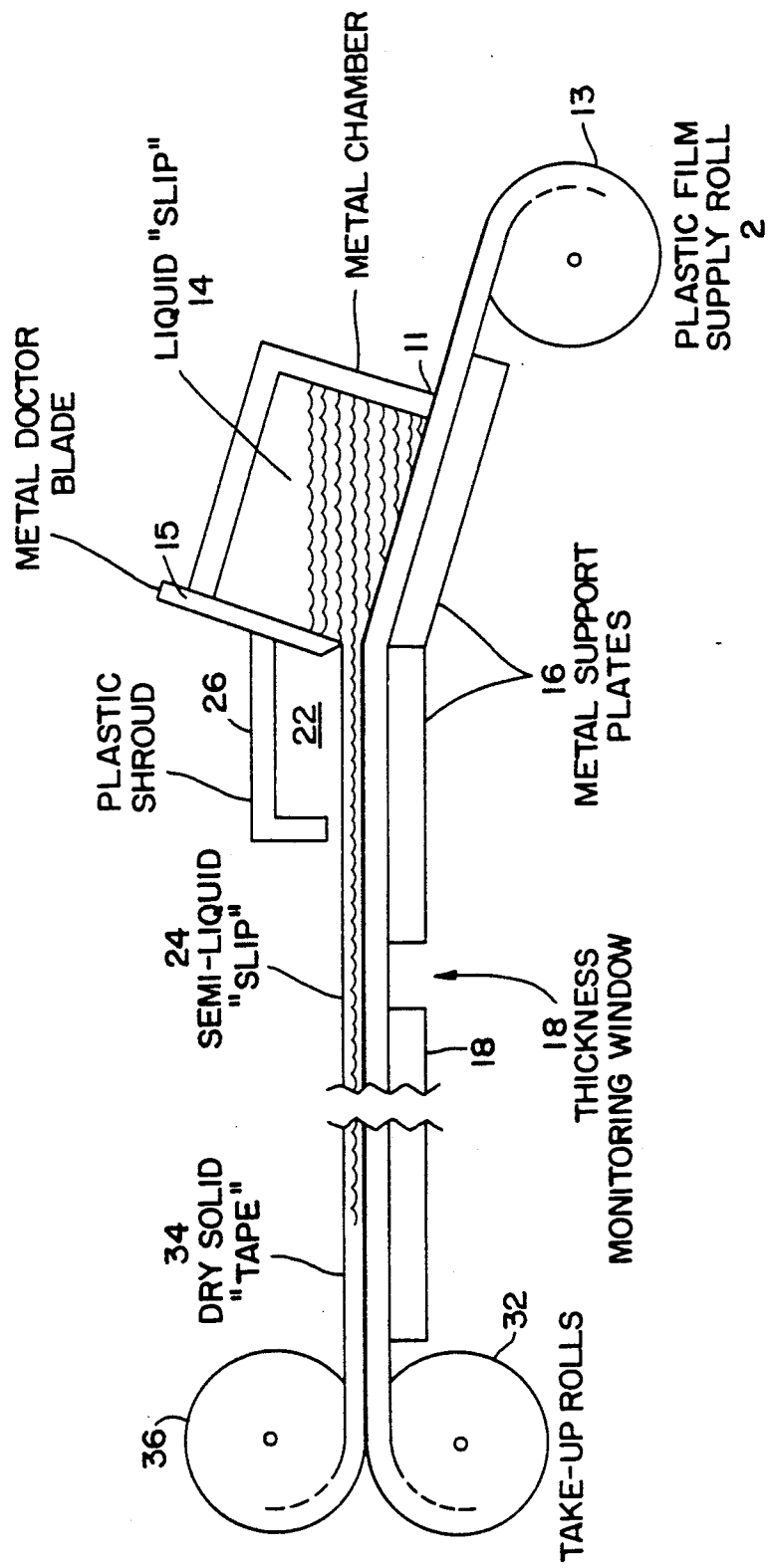

COMPOSITION USEFUL FOR PRODUCING THIN CERAMIC SHEETS

RELATED APPLICATIONS

This application is a continuation-in-part of our co-pending application, Ser. No. 07/296,519, filed Jan. 12, 1989 now abandoned.

TECHNICAL FIELD

This invention relates to the manufacture of thin sheets of ceramic and particularly to the doctor blade tape casting process for forming ceramics prior to firing.

BACKGROUND OF THE INVENTION

Thin sheets of ceramic material are useful as electrical insulators and supports for thin film electronic circuits and other applications. The forming of such sheets before firing is difficult, which results in a low yield of finished product, because the sheets tend to crack after casting.

Various methods have been employed for providing crack-free sheets before firing. (The material after casting and drying but before firing is commonly referred to as tape.) Such methods include nearly saturating the drying air with solvent vapor immediately after casting and using a support film of material such as cellulose acetate, so that the film will contract along with the shrinking tape during drying. These methods are difficult to reproduce, and they impose limitations on the range of materials and conditions that can be used. The prior art methodology is fully disclosed in the following references: U.S. Pat. No. 2,582,993 to HOWATT, U.S. Pat. No. 3,698,923 to STETSON and U.S. Pat. No. 3,780,150 to STETSON, as well as in Shanefield, et al. "Fine Grained Alumina Substrate: I, the Manufacturing Process," American Ceramic Society Bulletin, vol. 53, pp. 416-420, May 1974, Shanefield, "Tape Casting for Forming Advanced Ceramics," in "Encyclopedia of Materials Science and Engineering,", edited by M. B. Bever, Pergamon Press, 1986 and J. C. Williams, "Doctor-Blade Process," in "Treatise on Materials Science and Technology," edited by F. Y. Wang, Academic Press, 1976. The disclosures of these references are incorporated herein by reference

SUMMARY OF THE INVENTION

The well recognized process of the art of making a thin ceramic film comprises milling together a ceramic powder having a predetermined range of particle size and surface area, with a solvent and a dispersing agent, thereafter formulating a slip of uniform character by mixing into the foregoing mixture a binder resin and a plasticizer, if desired de-airing the slip, then spreading said slip in a thin film on a smooth support surface and removing the solvent from the film while retaining the remaining constituents of said slip in adherent relation to said film. Unfortunately, in this drying step cracks appear in the thus produced, prefired film which reduce its physical strength.

It is the surprising finding of this invention that such cracking may be substantially avoided by adding to the original mixture between 1 and 5% by weight of the ceramic powder as an additional component, a saturated or unsaturated fatty acid having between about 12 and about 20 carbon atoms in the skeleton thereof.

BRIEF DESCRIPTION OF THE DRAWINGS

FIG. 1 is a schematic side view of an apparatus for casting and drying thin sheets of ceramic in the tape form, before firing.

DETAILED DESCRIPTION OF THE DRAWINGS

For convenience, the invention will be described in terms of one commonly used process. However, it should be understood that the invention extends to many other embodiments which are suitable for making thin ceramic sheets.

The apparatus used, which is described by Shanefield in the Encyclopedia of Materials Science and Engineering, supra, is constructed as follows.

A roll of plastic film 13 is laid on metal support plates 16 and 17. Film 13 is supplied from supply roll 12 and runs to take up roll 32 both of which are located below plates 16 and 17. A monitoring window 18 is provided in plates 17. Support plates 17 are substantially horizontal and plate 16 subtends a small, downward angle (say 10° to 30°) to the horizontal. A container chamber 10 is located on the segment of the plastic film 13 located over plate 16. A sealing means 11 is provided at the interface of chamber 10 with film 13 except over the junction of plates 16 with 17. The sealing means is such that the film may pass freely thereunder, but liquids or suspensions within the chamber will not flow out except under the doctor blade 15. Above the juncture of plates 16 and 17 the chamber is partially closed by height adjustable doctor blade 15. A shroud 26, suitably plastic, extends from blade 15 over a small part of plate 17 but does not contact film 13. A take up roll 36 is provided above plate 17 at the end thereof distal from plate 16.

DESCRIPTION OF THE PREFERRED EMBODIMENTS

The process of making a thin ceramic film comprises milling together a ceramic powder having a predetermined range of particle size and surface area, with a solvent and a dispersing agent, thereafter formulating a slip of uniform character by mixing into the foregoing mixture a binder resin and a plasticizer, and if desired, de-airing the slip.

The mixture 14 is then poured or pumped into chamber 10. A plastic carrier film 13, typically polyethylene terephthalate, such as DuPont Mylar or Celanese Celanar, is moved by rollers 12 and 32 (or by other means under the chamber 110). In a different embodiment of the same invention, cellulose acetate is the carrier film.

The mixture wets the carrier film 13 and is carried along with it through a gap 22 at the bottom of one of the four sides of the chamber 10. The size of the gap 22 between doctor blade 15 and film 13 determines the thickness of the ceramic product, although a correction factor must be used to compensate for drying and firing shrinkages which take place later. The mixture is carried along on the moving film and dry air causes the solvent to evaporate, leaving the powder and the other organic materials such as the binder behind. The cracking which, in the prior art, appeared at this stage, may be substantially avoided by adding to the original mixture between 1 and 5% by weight of the ceramic powder as an additional component, a saturated or unsaturated fatty acid having between about 12 and about 20 carbon atoms in the skeleton thereof, suitably lauric acid, oleic acid, stearic acid, palmitic acid and arachidic acid.

These remaining materials 24, which when dry, comprises the tape, which can be pulled up off the carrier film 13 and wound onto take up roll 36. The tape is then typically cut into shape and fired.

After the film has been dried the process is completed by separating the film from the support surface and firing it at a temperature between about 900° C. and about 1700° C. for from about 1 to about 4 hours. Where the ceramic is, say, barium titanate, firing is at the lower end of the range, i.e., 900° to 1200° C.

During firing, the organic materials all burn or evaporate out, leaving only the ceramic powder, which sinters together, becoming a single solid body of higher bulk density and lower porosity than the powder in its original form.

The ceramic powder used includes any generally used a ceramic powder; particularly useful are alumina and barium titanate. Where the powder is alumina, utilizing magnesium oxide as an additional component as a grain growth reducer is particularly helpful. Utilizing a ceramic powder having a median particle size diameter of between about 0.2 to about 1.0 microns and a surface area of between about 5 to about 15 m²/g is desirable.

As the solvent there may be used a volatile hydroxylic solvent, suitably a lower alkanol such as isopropanol or the solvent pairs toluene/ethanol, octane/isopropanol and trichloroethylene/ethanol.

It is particularly desirable that the ceramic be dispersed in the solvent. As the dispersing agent, an oil such as menhaden oil or corn oil. That is to say, suitably glycerides of fatty acids. The dispersing agent as defined herein does not include stearic acid and similar fatty acids. An organic base such as polyethyleneimine may be used.

As the binder, polyvinyl butyral or polymethyl methacrylate, suitably of molecular weight about 10,000 to about 40,000 and as the plasticizer polyethylene glycol, suitably of molecular weight about 200 to about 500, triethylene glycol hexanoate and the phthalate esters of hexanol, octanol or decanol may be used.

EXAMPLE 1

Materials are mixed together in the following proportions by weight:

| Aluminum oxide powder | 100 |
|---|---|
| Toluene | 41 |
| Ethanol | 17 |
| Menhaden Oil | 1.5 |
| Stearic Acid | 2.4 |
| Polyvinyl butyral | 4.0 |
| Polyethylene glycol | 8.0 |

The above materials are placed in a porcelain ball mill jar of one quart capacity, with porcelain balls of half-inch diameter. The first 5 materials were mixed together by closing the mill jar, turning it on its side and rotating it for 24 hours. The binder and plasticizer were then added to the mixture in the ball mill for an additional 24 hours. The mixture was vacuum de-aired and then poured into the reservoir of the casting machine which had nearly-saturated air flowing through it. Casting was done with a doctor blade opening of 0.62 inch and a horizontal motion of 6 inches per minute.

The above method is repeated, except that lauric acid, arachidic acid, palmitic acid or oleic acid is substituted for stearic acid.

The results after 17 hours of drying were as follows:

| Additive | Appearance of Tape |
|---|---|
| (None) | 30% Cracked |
| Lauric Acid | 7% Cracked |
| Oleic Acid | 4% Cracked |
| Stearic Acid | 1% Cracked |
| Palmitic Acid | 4% Cracked |
| Arachidic Acid | 8% Cracked |

The tapes were fired at 1450° to 1600° C.

EXAMPLE 2

The method of Example 1 is followed, except that barium titanate powder is used instead of aluminum oxide and firing is done in the range of 900° to 1200° C. for 1 to 3 hours.

EXAMPLE 3

The method of Example 1 is followed, except that the solvents are 41 grams of octane and 17 grams of isopropanol, instead of toluene and ethanol.

EXAMPLE 4

The method of Example 3 is followed, except that the dispersant is corn oil or polyethyleneimine, instead of menhaden oil.

It is to be understood that the above-described embodiments are simply illustrative of the principles of the invention. Various other modifications and changes may be devised by those skilled in art, which will embody the principles of the invention and fall within the spirit and scope thereof.

We claim:

1. In a process of making a thin ceramic film which comprises:
   (a) milling together
      (i) a ceramic powder having a predetermined range of particle size and surface area,
      (ii) a solvent,
      (iii) a dispersing agent Menhaden Oil
   (b) formulating a slip of uniform character by mixing into said mixture formed in step (a);
      (iv) a binder resin and
      (v) a plasticizer,
   (c) spreading said slip in a thin film on a smooth support surface,
   (d) removing the solvent from the film while retaining the remaining constituents of said slip in adherent relation to said film,
   the improvement comprising:
   adding to the mixture of step (a) between 1 and 5% by weight of said powder as an additional component (vi), a saturated or unsaturated fatty acid having between about 12 and about 20 carbon atoms in the skeleton thereof.

2. In a process of claim 1, utilizing, as the acid of component (vi) an acid selected from the group consisting of lauric acid, oleic acid, stearic acid, palmitic acid and arachidic acid.

3. In a process of claim 1 utilizing, as the ceramic powder of component (i), a ceramic powder selected from the group consisting of alumina and barium titanate.

4. In a process of claim 1 utilizing, as the solvent of component (ii), a solvent selected from the group consisting of isopropanol and the solvent pairs toluene/ethanol, octane/isopropanol and trichloroethylene/ethanol.

5. In a process of claim 1, utilizing as the binder of component (iv), polyvinyl butyral or polymethyl methacrylate and as the plasticizer of component (v), at least one member selected from the group consisting of polyethylene glycol, triethylene glycol hexanoate and the phthalate esters of hexanol, octanol and decanol.

6. In a process of claim 1, utilizing as the ceramic powder of component (i) a ceramic powder having a median particle size diameter of between about 0.2 to about 1.0 microns and a surface area of between about 5 to about 15 $m^2/g$.

7. In a process of claim 3, where component (i) is alumina, utilizing magnesium oxide as an additional component of step (a) as grain growth reducer.

8. In a process of claim 1, the additional steps, after step (d), comprising:
　(e) separating said film from said tape and
　(f) firing said film at a temperature between about 900° C. and about 1600° C. for from about 1 to about 4 hours.

* * * * *